US010671630B2

United States Patent
Tran et al.

(10) Patent No.: US 10,671,630 B2
(45) Date of Patent: Jun. 2, 2020

(54) EXTERNAL ACCESS TO DATABASE CONTAINER ARTIFACTS

(71) Applicant: SAP SE, Walldorf (DE)

(72) Inventors: Le-Huan Stefan Tran, Wiesloch (DE);
Arne Harren, Walldorf (DE);
Jonathan Bregler, Kraichtal (DE);
Alexander Bunte, Heidelberg (DE);
Andreas Kellner, Birkenau (DE);
Daniel Kuntze, Bruchsal (DE);
Vladislav Leonkev, Walldorf (DE);
Simon Lueders, Walldorf (DE); Volker Sauermann, Dossenheim (DE);
Michael Schnaubelt, Leimen (DE)

(73) Assignee: SAP SE, Walldorf (DE)

( * ) Notice: Subject to any disclaimer, the term of this patent is extended or adjusted under 35 U.S.C. 154(b) by 372 days.

(21) Appl. No.: 15/222,035

(22) Filed: Jul. 28, 2016

(65) Prior Publication Data

US 2017/0323112 A1     Nov. 9, 2017

Related U.S. Application Data

(60) Provisional application No. 62/333,439, filed on May 9, 2016.

(51) Int. Cl.
| | | |
|---|---|---|
| *G06F 16/21* | (2019.01) | |
| *G06F 16/25* | (2019.01) | |
| *G06F 16/2455* | (2019.01) | |
| *G06F 21/62* | (2013.01) | |

(52) U.S. Cl.
CPC ............ *G06F 16/258* (2019.01); *G06F 16/21* (2019.01); *G06F 16/214* (2019.01); *G06F 16/24554* (2019.01); *G06F 21/6218* (2013.01)

(58) Field of Classification Search
CPC ......... G06F 17/30569; G06F 17/30289; G06F 2221/2113
See application file for complete search history.

(56) References Cited

U.S. PATENT DOCUMENTS

| | | |
|---|---|---|
| 7,222,308 B2 | 5/2007 | Sauermann et al. |
| 7,231,387 B2 | 6/2007 | Sauermann et al. |
| 7,257,599 B2 | 8/2007 | Sauermann et al. |
| 7,310,719 B2 | 12/2007 | Bergen et al. |
| 7,337,295 B2 | 2/2008 | Bergen et al. |
| 7,665,030 B2 | 2/2010 | Sauermann et al. |
| 8,074,206 B2 | 12/2011 | Sauermann et al. |

(Continued)

OTHER PUBLICATIONS

U.S. Appl. No. 10/418,305, Bergen et al., filed Apr. 18, 2003.

(Continued)

*Primary Examiner* — Apu M Mofiz
*Assistant Examiner* — Cindy Nguyen
(74) *Attorney, Agent, or Firm* — Fish & Richardson P.C.

(57) ABSTRACT

A database includes a run-time database container, which provides an isolated computing environment for a database object deployed therein. The database further includes a public synonym object outside the run-time database container in the database. The public synonym object is associated with the database object deployed inside the run-time database container and provides external access to the database object deployed inside the run-time database container independent of the location of the run-time database container.

14 Claims, 8 Drawing Sheets

(56) References Cited

U.S. PATENT DOCUMENTS

| | | |
|---|---|---|
| 8,203,972 B2 | 6/2012 | Sauermann |
| 8,171,422 B2 | 12/2012 | Sauermann |
| 8,510,710 B2 | 8/2013 | Harren et al. |
| 9,026,857 B2 | 5/2015 | Becker et al. |
| 9,069,832 B2 | 6/2015 | Becker et al. |
| 9,600,269 B1 | 3/2017 | Bregler et al. |
| 9,710,262 B2 | 7/2017 | Bregler et al. |
| 9,996,330 B2 | 6/2018 | Bregler et al. |
| 10,025,568 B2 | 7/2018 | Mayer et al. |
| 10,042,734 B2 | 8/2018 | Tran et al. |
| 10,203,952 B2 | 2/2019 | Schildt et al. |
| 2004/0021695 A1 | 2/2004 | Sauermann et al. |
| 2004/0085362 A1 | 5/2004 | Sauermann et al. |
| 2004/0093329 A1 | 5/2004 | Von Begen et al. |
| 2004/0210887 A1 | 10/2004 | Bergen et al. |
| 2004/0210888 A1 | 10/2004 | Bergen et al. |
| 2004/0210898 A1 | 10/2004 | Bergen et al. |
| 2005/0010606 A1 | 1/2005 | Kaiser et al. |
| 2005/0021506 A1 | 1/2005 | Sauermann et al. |
| 2005/0021923 A1 | 1/2005 | Von Bergen et al. |
| 2005/0021924 A1 | 1/2005 | Bergen et al. |
| 2005/0027694 A1 | 2/2005 | Sauermann |
| 2005/0080690 A1 | 4/2005 | Sauermann et al. |
| 2005/0080803 A1 | 4/2005 | Sauermann |
| 2005/0091606 A1 | 4/2005 | Sauermann |
| 2005/0114323 A1 | 5/2005 | Sauermann |
| 2005/0125799 A1 | 6/2005 | Sauermann |
| 2005/0177833 A1 | 8/2005 | Sauermann |
| 2005/0262158 A1 | 11/2005 | Sauermann |
| 2005/0262431 A1 | 11/2005 | Sauermann |
| 2005/0262450 A1 | 11/2005 | Sauermann |
| 2005/0262452 A1 | 11/2005 | Sauermann |
| 2006/0002313 A1 | 1/2006 | Sauermann |
| 2006/0020767 A1 | 1/2006 | Sauermann |
| 2006/0036477 A1 | 2/2006 | Sauermann |
| 2006/0085465 A1* | 4/2006 | Nori ................. G06F 17/30297 |
| 2006/0143575 A1 | 6/2006 | Sauermann |
| 2006/0173862 A1 | 8/2006 | Sauermann |
| 2006/0248085 A1* | 11/2006 | Sack .................. G06F 21/6227 |
| 2007/0038597 A1 | 2/2007 | Sauermann |
| 2007/0083861 A1 | 4/2007 | Becker et al. |
| 2007/0234366 A1 | 10/2007 | Morich et al. |
| 2008/0091690 A1* | 4/2008 | Ellersick ................. G06F 8/10 |
| 2009/0265314 A1 | 10/2009 | Kindsvogel et al. |
| 2010/0138821 A1* | 6/2010 | Driesen .................... G06F 8/65 |
| | | 717/168 |
| 2011/0252005 A1* | 10/2011 | Lauer .................. G06F 16/2471 |
| | | 707/690 |
| 2012/0166422 A1 | 6/2012 | Harren et al. |
| 2013/0179862 A1 | 7/2013 | Kinder et al. |
| 2014/0101646 A1* | 4/2014 | Buzaski ............. G06F 17/30174 |
| | | 717/168 |
| 2014/0201811 A1* | 7/2014 | Sack .................. G06F 21/6227 |
| | | 726/3 |
| 2015/0149745 A1 | 5/2015 | Eble et al. |
| 2015/0248280 A1* | 9/2015 | Pillay ...................... G06F 8/60 |
| | | 717/106 |
| 2017/0103226 A1 | 4/2017 | Eberlein et al. |
| 2017/0147311 A1 | 5/2017 | Bregler et al. |
| 2017/0161511 A1 | 6/2017 | Eberlein et al. |
| 2017/0177180 A1 | 6/2017 | Bachmann et al. |
| 2017/0286467 A1 | 10/2017 | Eberlein et al. |
| 2017/0322863 A1 | 11/2017 | Tran et al. |
| 2017/0322871 A1 | 11/2017 | Tran et al. |
| 2017/0322966 A1 | 11/2017 | Tran et al. |
| 2017/0322976 A1 | 11/2017 | Tran et al. |
| 2017/0322989 A1 | 11/2017 | Tran et al. |
| 2017/0322990 A1 | 11/2017 | Tran et al. |
| 2017/0322991 A1 | 11/2017 | Tran et al. |
| 2017/0323242 A1 | 11/2017 | Tran et al. |
| 2017/0323247 A1 | 11/2017 | Tran et al. |
| 2018/0137145 A1 | 5/2018 | Mayer et al. |
| 2018/0285390 A1 | 10/2018 | Mayer et al. |
| 2019/0005054 A1 | 1/2019 | Bregler et al. |
| 2019/0005074 A1 | 1/2019 | Bregler et al. |
| 2019/0005108 A1 | 1/2019 | Bregler et al. |
| 2019/0007895 A1 | 1/2019 | Bregler et al. |
| 2019/0042588 A1 | 2/2019 | Bregler et al. |

OTHER PUBLICATIONS

U.S. Appl. No. 10/418,307, Bergen et al., filed Apr. 18, 2003.
U.S. Appl. No. 15/824,041, Bregler et al., filed Jan. 28, 2017.
U.S. Appl. No. 15/874,317, Eberlein et al, filed Jan. 18, 2018.

* cited by examiner

400

┌─────────────────────────────────────────────┐
│ Unpack the export archive or file to separate constituent │
│ common metadata, container, and container metadata │
│ information │
│ 402 │
└─────────────────────────────────────────────┘
                        ↓
┌─────────────────────────────────────────────┐
│ Create target tables with the same structures as the objects │
│ (e.g., calculation views, shadow tables, etc.) identified by │
│ common metadata and populate the target tables with the │
│ container-related data │
│ 404 │
└─────────────────────────────────────────────┘
                        ↓
┌─────────────────────────────────────────────┐
│ Create objects corresponding to dependencies of the │
│ deployed database objects (e.g., public and private │
│ synonyms, generic business application data object, etc.) │
│ that are identified by the container metadata │
│ 406 │
└─────────────────────────────────────────────┘
                        ↓
┌─────────────────────────────────────────────┐
│ Create an imported container with data objects (e.g., view │
│ 201, table 202, synonym 203, etc.) deployed therein │
│ 408 │
└─────────────────────────────────────────────┘

Creating a public synonym object outside the run-time database container in the database
810

Configuring the public synonym object as an external link to a database object in the run-time database container independent of the name and location (e.g., directory name or path) of the run-time database container
812

Creating the public synonym object as a singleton database object
814

Selecting a public synonym name under the same namespace rules applicable to database objects and database containers across the database
816

Using a public synonym plugin to convert a design-time specification file into the public synonym object
818

FIG. 8

EXTERNAL ACCESS TO DATABASE CONTAINER ARTIFACTS

CROSS-REFERENCE TO RELATED APPLICATIONS

This application is a non-provisional of, and claims priority to, U.S. Provisional Application No. 62/333,439 filed May 9, 2016, entitled DATABASE DEPLOYMENT CONTAINERS, the disclosure of which is incorporated by reference herein in its entirety.

BACKGROUND

In the context of computers and computer programs (e.g., applications) that are used in information technology, a database is an organized or structured collection of data (values). The data in the database may include data describing instances of database objects (e.g., tables, queries, reports, views and other objects) and may include schemas describing the types or structures of the database objects.

Large database systems (e.g., enterprise resource planning ("ERP") systems and customer relationship management ("CRM") systems) can include database objects that store and organize data, as well as database objects for accessing the data. For example, in some database systems a database object may include a table, an index, and a view, as well as a procedure for accessing one or more tables, a procedure importing data into one or more tables, or a calculation view procedure that manipulates the data in one or more tables. Pushing down data-intensive computations into the database layer minimizes data transfers between the database layer and an application layer and takes advantage of in-memory capabilities, which are becoming more common. Because the database objects of such a system include procedures and other objects for manipulating the data, an application developer may himself or herself develop some of the database objects, for example, by developing design-time artifacts that are deployed to the database as run-time database objects.

"Artifacts," as the term is often used in the context of software development, may be understood to refer to data models, workflow diagrams, test matrices and plans, setup scripts, use cases, class diagrams, UML models, requirements, design documents or other documents, which help describe the function, architecture, and design of a software product (e.g., a database object). In some instances, the term database "artifacts" may be used to refer to the software product itself (e.g., the database object itself).

A database management system (DBMS) may provide access to data in the database. The DBMS may provide various functions that allow entry, storage, and retrieval of information and provide ways to manage how that information is organized in the database. The DBMS may be used to manage more than one database. Both the database and its DBMS may conform to the principles of a particular database model (e.g. hierarchical, relational, network, document, etc.). Often the term "database" is used to refer to both the database and the DBMS used to manipulate the database. Further, the term "database system" may be used to refer collectively to the database model, the database management system, and the database.

In some database systems, one or more of the database objects deployed in the database may be grouped or packaged in a so-called container (hereinafter—a database container or a run-time container). The database container may be a class, a data structure (or schema), or an abstract data type whose instances are collections of other objects. The database container may store objects in an organized way that follows specific access rules. For example, the database container may act as a sandbox to isolate database objects in the container from deployment and run-time errors of other database objects or containers in the database. Access to database container content may be controlled by database privileges, for example, by granting SELECT or EXECUTE privileges.

The present disclosure relates to importing or exporting a database with deployed database or run-time containers therein.

SUMMARY

A database container schema provides an isolated computing environment for one or more database objects deployed therein.

A computer-implemented method provides external access to a database object inside a run-time database container of a database. In a general aspect, the method includes creating a public synonym object outside the run-time database container in the database. The public synonym object is associated with the database object inside the run-time database container, and is configured to provide an external link to the database object inside the run-time database container independent of the name and location of the run-time database container.

The details of one or more implementations are set forth in the accompanying drawings and the description below. Further features of the disclosed subject matter, its nature and various advantages will be more apparent from the accompanying drawings, the following detailed description, and the claims.

BRIEF DESCRIPTION OF THE DRAWINGS

FIG. 4 is a flowchart illustrating an example method for importing a database container into a database, in accordance with the principles of the present disclosure.

FIG. 8 is a flowchart illustrating an example computer-implemented method for providing external access to a database object deployed inside a run-time database container of a database, in accordance with the principles of the present disclosure.

DETAILED DESCRIPTION

A deployed database container may be generated and maintained in a database for specific application tasks and may, thus, represent actions and data elements related to a real-world or conceptual object, such as a sales order, an invoice, a schedule, etc. For example, a database container may be created for a sales order and may include instructions for performing specific tasks on the data related to the sales order, as well as defining the sales data itself. A deployed database container may access another container via a private name or synonym for the other container, if the other container allows such access. Database containers may be complex, with hundreds or even thousands of database artifacts, making deployment of the artifacts difficult and time consuming.

Importing or exporting deployed database containers from one database to another database or datastore may be relevant or useful in scenarios involving, for example, database migration, copy, backup, testing, debugging, version upgrading, etc.

Figure 1:
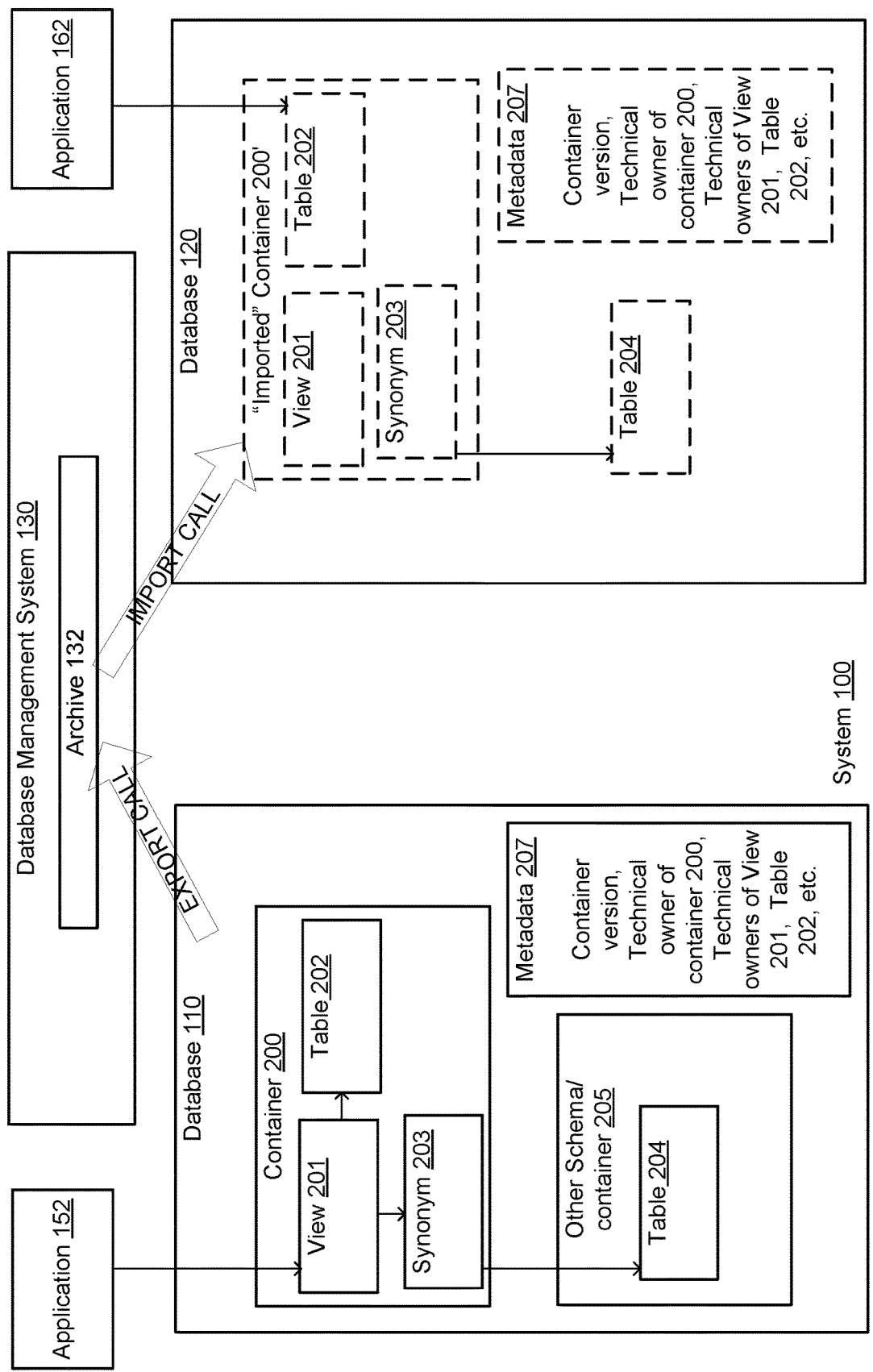
FIG. 1 is a block diagram illustration of an example database system used to import or export a deployed database container from a first database to a second database, in accordance with the principles of the present disclosure.

FIG. 1 shows an example database system 100 that may be used to illustrate an example processes for importing or exporting a deployed database container from a first database to a second database, in accordance with the principles of the present disclosure.

Database system 100 may include a first database 110 and a second database 120, which may be accessible, for example, to respective applications 152 and 162 running on respective client computers (not shown). Both database 110 and database 120 may be managed by, for example, a common data base management system (DBMS) 130. Database 110 may include one or more database objects (e.g., tables, views, indexes, core data services ("CDS"), calculation views, table import procedures, sequences, etc.) that are organized or arranged in containers (e.g., database container 200, database container 205, etc.). Each container may provide an isolated environment for the database objects therein. For example, each container may be a separate database schema and act as a sandbox to insulate the database objects therein from deployment and run-time errors of other containers. Database container 200 may, for example, provide an isolated environment for application 152 to interact with view 201, table 202, synonym 203, etc. Synonym 203 may provide a link by which objects in container 200 (or application 152 operating through objects in container 200) can access data external to container 200. For example, synonym 203, as shown in FIG. 1, may provide a link for view 201 in container 200 to access table 204, which may be deployed in another container 205 external to container 200 in database 110. Synonym 203 may be referred to as a "private" synonym of container 200 when it is specific to container 200 and can be only used from within container 200 to access its corresponding external object (e.g., table 204 deployed in another container 205). Authorizations to access the external object (e.g., table 204) may be associated with authorizations to access the private synonym (e.g., synonym 203) in container 200. Thus, if application 152 does not have permission to access table 204 in container 205, database 110 may issue a run-time error when application 152/view 201 attempts to call synonym 203 in container 200 to access table 204 in container 205.

In addition to the database objects deployed in the containers, database 110 may store metadata, for example, metadata related to the containers themselves, at a location external to the containers in the database. FIG. 1 shows, for example, container metadata 207 stored in a location external to the containers in database 110. Container metadata 207 may, for example, include metadata specific to container 200 (e.g., container 200 version information and data identifying technical owners or authorized users of container 200 and individual database objects therein (e.g., view 201, table 202, etc.)) Other metadata (e.g., common metadata 209, FIG. 2), which may be stored in a location external to the containers in database 110, may include metadata that is not limited or specific to container 200. Such metadata may, for example, relate to external database objects (e.g., complex procedures, calculation views, etc.) that may be accessible to container 200 or other containers, for example, via synonyms.

Importing or exporting deployed database container 200 from database 110 to another database or datastore (e.g., database 120) may be relevant in scenarios involving, for example, database migration, copy, backup, testing, debugging, upgrading, etc.

As an example, a database administrator noting an error or problem with processing of data (e.g., customer data) in database container 200 (e.g., in the execution of application 152) may want to export the problematic container from database 140 to a back office computer for analysis or debugging. In principle, the entire problematic container (e.g., database container 200) with all of its data content (e.g., in view 201, table 202 and synonym 203, etc.) could be saved or archived to a file in a traditional database export operation using, for example, SQL SAVE commands provided by DBMS 130, and the file transferred to the back office computer for analysis or debugging. However, such a traditional database export operation exporting all of the data content of container 200 to the back office computer presents a risk of improper disclosure of the data. The data content of a container may, for example, include a customer's private data or other sensitive data, which could be undesirably exposed (e.g., at the back office computer) to unauthorized parties.

Further, the traditional database export operation may not export all of the data relevant to debugging the error or problem with the processing of data in the execution of application 152 as the data accessed by application 152 in database 110 may not reside only in database container 200, but may also reside in database schemata or structures external to database container 200 (e.g., table 204 in other schema 205). Furthermore, database artifacts related to database container 200 (e.g., metadata 207 including container version information, etc.) may be stored at a location external to database container 200.

Figure 2:
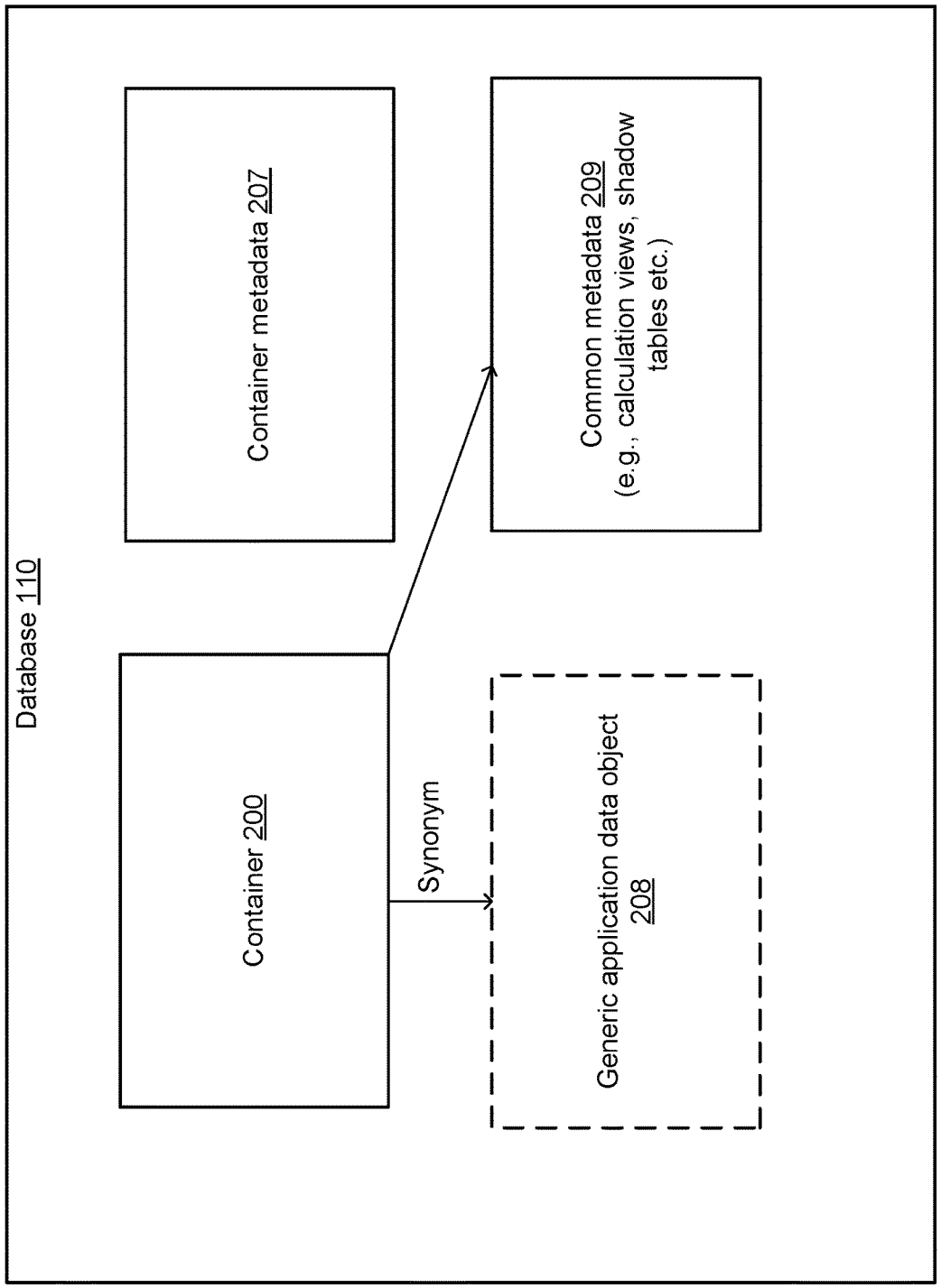
FIG. 2 is a schematic diagram identifying structural data related to a database container that may reside in a database and that can be exported along with the database container to make the exported database container fully functional in a new location, in accordance with the principles of the present disclosure.

FIG. 2 schematically shows the relevant structural data related to database container 200 that may reside in database 110 and should be exported along with database container 200 to make the exported database container fully functional in its new location. The relevant structural data, in addition to database container 200, may include, for example, container metadata 207 (e.g. container version information, etc.), generic application data object 208 (e.g., table 204, which may be accessed from database container 200 via a synonym (e.g., synonym 203)) and common metadata 209 (e.g., metadata describing common database objects in database 110 such as calculation views and shadow tables, etc., that may involve or use multiple data sources including container 200 data objects, but are stored outside container 200).

Figure 3:
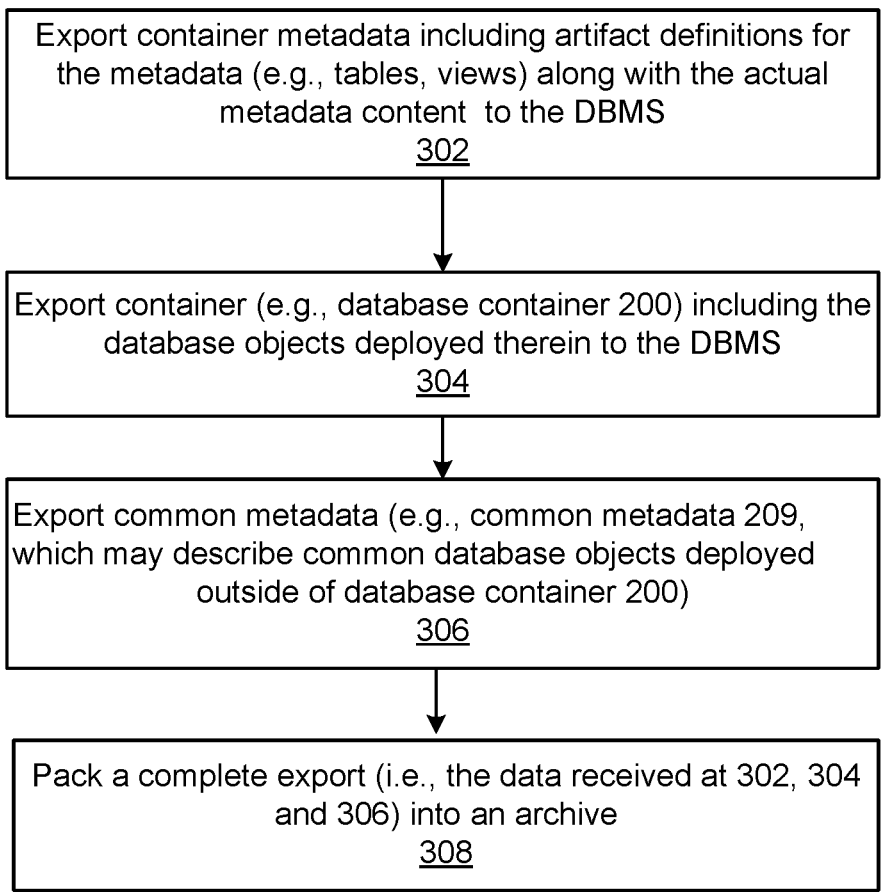
FIG. 3 is a flowchart illustrating an example method for exporting a database container from a database, in accordance with the principles of the present disclosure.

FIG. 3 is a flowchart of an example method 300 for exporting a database container, in accordance with the principles of the present disclosure. Method 300 may overcome the deficiencies of the traditional database export operation noted in the foregoing, by exporting all relevant structural data that may be needed for the proper functioning of the exported database container in a new location, but not exporting the data content (e.g., customer data) in the database container to avoid the risk of improper disclosure of the data content at the new location.

Method 300 may be implemented (e.g., by DBMS 130) to export, for example, database container 200 from database 110 to database 120. Method 300 may include, first, exporting container metadata 207 including artifact definitions in the metadata (e.g., tables, views, etc.) along with the metadata content to the DBMS (302). Method 300 may further involve exporting container 200 including the database objects deployed therein (e.g., view 201, table 202, synonym 203, etc.) to the DBMS (304). Exporting container 200 to the DBMS 304 may include exporting all dependencies and structures of the deployed database objects (e.g., private synonyms, generic application data object 208, etc.) but specifically exclude exporting the data content (e.g., field values) of the database objects. In other words, exporting container 200 to the DBMS 304 may specifically exclude all customer data that may be stored in the deployed database objects (e.g., table 202, etc.).

Method 300 may also include exporting common metadata (e.g., common metadata 209), which may describe common database objects deployed outside of, or external to, database container 200 (306). The common database objects (e.g., calculation views, shadow tables, etc.) may use objects stored in database container 200, but may not be limited to using only objects stored in database container 200. Exporting common metadata 209 may involve extracting and exporting only the data subsets (of the common database objects) that are related to container 200. In some implementations, the export of common metadata 209 may be accomplished using predefined SQL statements. Extracting and exporting only the container-related data subsets may, for example, further include creating tables with the same structures as the common database objects identified by common metadata 209 and transferring only container-related data rows to the created tables.

Method 300 may lastly include packing a complete export data set (i.e., the data received at 302, 304, and 306) into an export archive or file (e.g., archive 132) at DBMS 130 (308).

Archive 132 produced by method 300 may be a binary file. Archive 132 may be used by DBMS 130 to import database container 200 into another database (e.g., database 120) by unpacking the data packed in the export archive or binary file.

FIG. 4 is a flowchart for an example data container import method 400, which complements data container export method 300, in accordance with the principles of the present disclosure.

Method 400 may include unpacking the export archive or file to separate the constituent common metadata, container, and container metadata information (402). Method 400 may include creating target objects in a target database (e.g., database 120) with the same structures as the objects identified by common metadata 209 and populating the created target objects (e.g., tables) with the container-related data (e.g., data rows) (404)). Method 400 may further include creating, in the target database (e.g., database 120), database objects corresponding to dependencies of the deployed database objects (e.g., synonyms, generic application data object 208, etc.) that are identified by the container metadata (406), and creating an imported database container with database objects (e.g., view 201, table 202, synonym 203, etc.) deployed therein (408). The imported database container and the deployed database objects therein may have the same structures and dependencies as the database container exported from the first database. However, the imported database container and the deployed database objects therein but may not include the actual data content of the database container of the first database in the imported database container.

When database container 200 of database 110 includes a synonym object (e.g., synonym 203) referencing an object (e.g., table 204) external to database container 200, method 400 further includes creating a target object in database 120 corresponding to the object external to database container 200 in the database 110 referenced by the synonym object.

It will be noted that in import method 400, the steps of export method 300 are performed substantially in reverse order.

In example implementations of DBMS 130, the methods for exporting and importing the database container (e.g., export method 300 and import method 400) may be initiated by using "CALL" SQL commands (e.g., CALL EXPORT (ext. parameter) and CALL IMPORT (ext. parameter), respectively).

In general, the foregoing database container export and import methods (e.g., method 300 and method 400, respectively) specifically exclude transfer of the data content (e.g., customer data) of the container database objects and the related artifacts from database 110 to database 120 to avoid the risk of improper disclosure of the data content at the new location. Only the structures of the container database objects and the related artifacts, and non-sensitive data are transferred (e.g., from database 110 to database 120) by the export and import methods.

However, in some scenarios, it may be desirable to include transfer of customer data or other sensitive data (e.g., the actual content or data rows of tables accessed by view 201, table 202, or generic application data object 208) in the database container export and import methods. An example use case for exporting a database container with sensitive data would be to back up a current database container. In case of a corrupted database container, or undesired changes to the database container, in a database, the current database container could be deleted and replaced by an import of the backup database container. For such a backup scenario, database container export and import methods (e.g., method 300 and method 400, respectively) may be modified to accommodate transfer of the sensitive data along with the transfer of the database container. For example, in a modified version of method 300, exporting container 200 at 304 to the DBMS, in addition to exporting all structures and dependencies of the deployed database objects (e.g., synonyms, view 201, table 202, generic business application data object 208, etc.) may include exporting the actual content of the database objects (e.g., the actual content of view 201, table 202, generic business application data object 208, etc.). Whether the data content of a database object is included in the export or import of a database container may be controlled by a parameter passed to method 300 or method 400, respectively.

In example implementations of DBMS 130, the modified versions of methods 300 and 400 may be activated, for example, by YES or NO options in the CALL commands (e.g., EXPORT CALL (ext. parameter, private data=YES or NO) and IMPORT CALL (ext. parameter, sensitive data=YES or NO), respectively) for initiating the export and import methods.

It will be noted that the database container export and import methods (e.g., methods 300 and 400), which are described herein with reference to FIGS. 1-4 herein, may be used to transfer database containers (e.g., container 200) which have been previously deployed in the databases as run-time containers (RTC).

In some example database system implementations, the RTC can be created or deployed in databases (e.g., database 110) by conversion or transformation of design-time artifacts in corresponding design-time containers (DTC) previously created in a deployment infrastructure (DI) coupled to, or part of a DBMS (e.g. DBMS 130). The container deployment methods may use artifact type-specific conversion engines (or "build plug-ins") to convert or transform design-time artifacts in a DTC into run-time database objects in a run-time container (RTC). For example, a view-type conversion engine may be used to convert view-type design-time artifacts into run-time view objects in the run-time container. The DTC may be used to store design-time artifacts in the DI, and the corresponding RTC (e.g., database container 200) may be used to store the corresponding deployed run-time database objects (e.g., view 201, table 202, synonym 203, etc.) in database 110. The architecture of DI may distinguish design-time artifacts from run-time database objects, for example, by introducing the following, distinct but associated container types:

(a) Design-time container (DTC) as an isolated environment for design-time artifacts or files, and (b) Run-time container (RTC) as a store of the deployed database objects that are built according to the specification stored in the corresponding design-time artifacts or files in the DTC.

The database container export and import methods (e.g., method 300 and method 400) described herein can export and import an RTC (e.g. database container 200), respectively, without involving any artifact conversion engines or build plug-ins that may have been previously used to transform or deploy design-time artifacts in a DTC as database objects in the RTC. Once an RTC for one database has been created (e.g., by developers/administrators) from design-time artifacts in a DTC, the same RTC may be copied or propagated to a second database by methods 300 and 400.

In some descriptions, a DTC and a corresponding RTC may be collectively referred to, in the singular, as the "development infrastructure (DI) container."

An issue (which may arise, for example, in database migration or copy scenarios) relates to external access by an existing application to a database object or artifact in an imported RTC (hereinafter "new" RTC) in a database. The new RTC may have been another RTC (hereinafter "original" RTC), which may have been exported, moved, copied or migrated from an original location to be the new RTC at a new current location in the database. Both the new RTC and the original RTC may contain the same set of database objects and local synonym objects (e.g., as described above in the context of methods 300 and 400). However, the new RTC at its new current location may have a correspondingly different directory name or path leading to its current location in the database. Thus, the existing application may have to be changed or recoded so that a call to a database object in the new RTC is properly addressed to its current location in the database.

Figure 5:
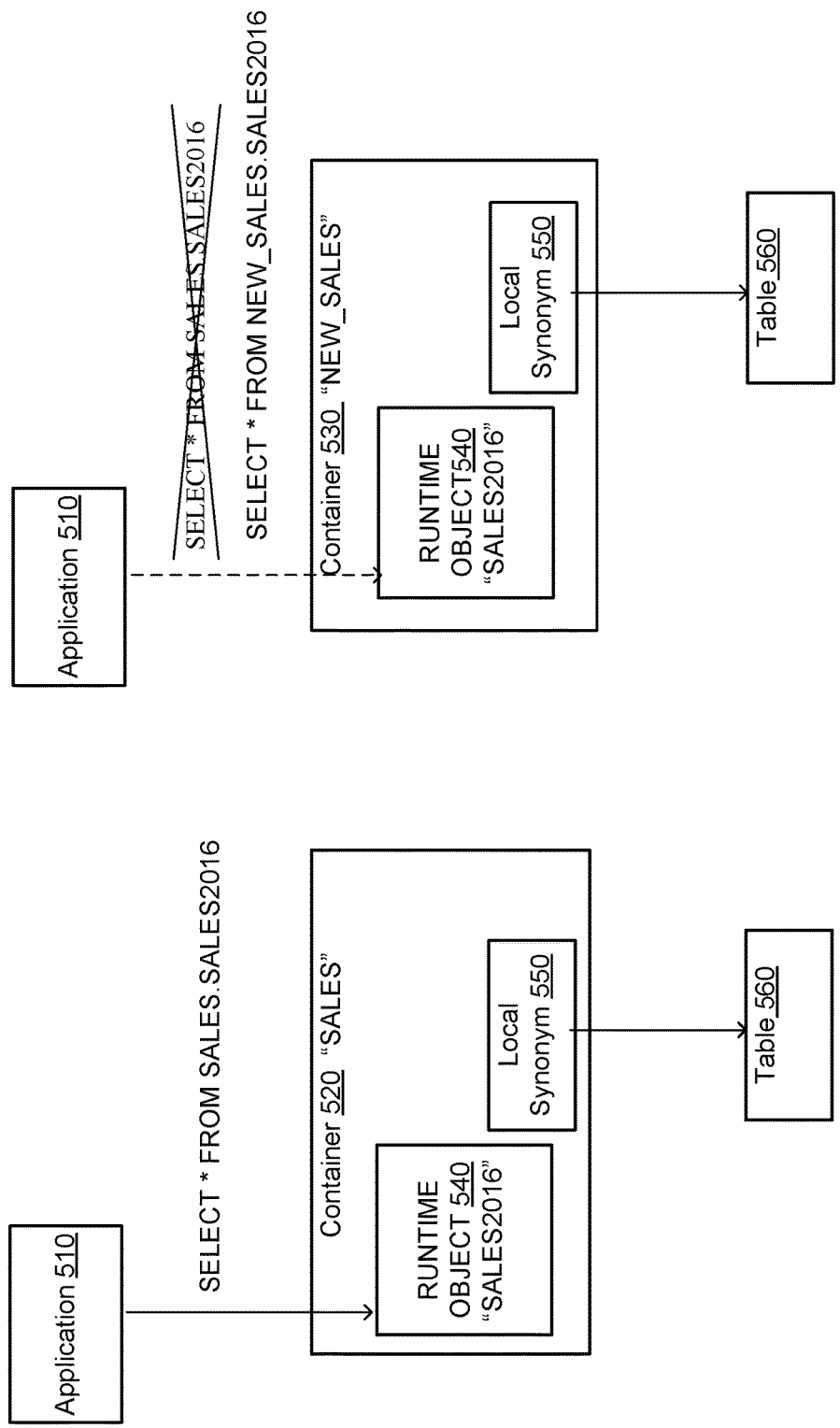
FIG. 5 is a schematic block diagram illustration of interactions of an existing application with an original run-time database container 520 and a new run-time database container 530 in a database.

FIG. 5 schematically shows, for example, interactions of an existing application 510 with an original RTC 520 and a new RTC 530 in a database. Original RTC 520, which is named "SALES," and new RTC 530, which is named "NEW_SALES," may both contain the same internal database objects (e.g., run-time object 540 "SALES2016", local synonym 550, which is a link to container-external table 560, etc.). As shown in FIG. 5, existing application 510 may be coded to externally access run-time object 540 SALES2016 in original RTC 520 SALES using, for example, a SQL SELECT statement (e.g., SELECT*FROM SALES.SALES2016) addressing run-time object 540 SALES2016 at its location in original RTC 520 SALES. However, an addressing error will result if existing application 510 attempts to access run-time object 540 SALES2016 in new RTC 530 NEW_SALES using the SELECT*FROM SALES.SALES2016 statement. Existing application 510 may be able to access run-time object 540 SALES2016 in new RTC 530 NEW_SALES only if application 510 is, for example, recoded to properly address run-time object 540 SALES2016 at its new location in new RTC 540 NEW_SALES (e.g., SELECT*FROM NEW_SALES.SALES2016).

Recoding existing applications to access a database object in an RTC, each time the RTC is exported to a new database, file, or directory location, can be laborious and expensive. To obviate the need to recode existing applications to access the database object in the RTC, a public synonym may be associated with the database object, in accordance with the principles of the present disclosure. The public synonym may provide an external access link or reference to the database object in the RTC independent of the location (e.g., directory name or path) of the RTC.

Figure 6:
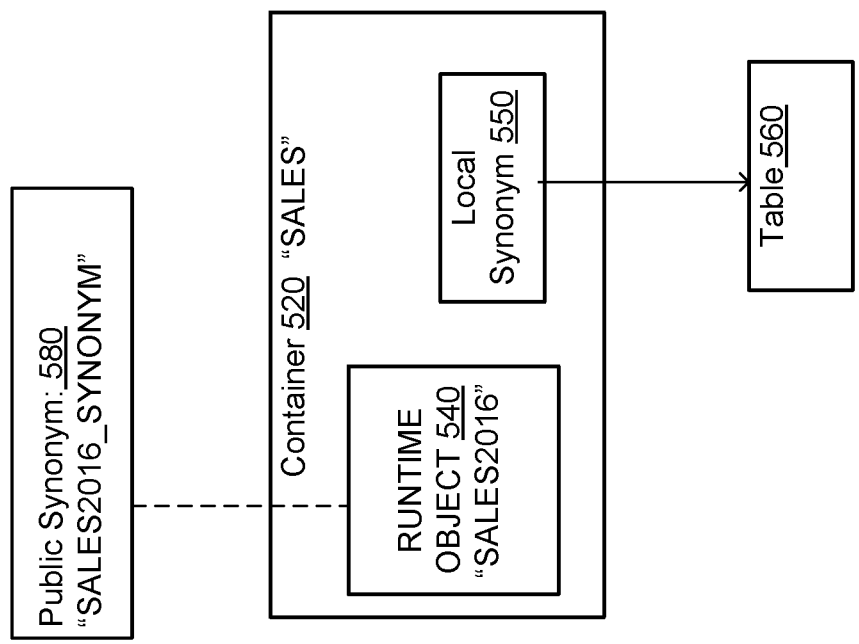
FIG. 6 is a schematic block diagram illustration of a public synonym object, which may be associated with a database object deployed inside a run-time database container and provide an external link or reference to the database object deployed inside the run-time database container independent of the name of the run-time database container, in accordance with the principles of the present disclosure.

FIG. 6 shows, for example, a public synonym 580, which may be associated with a database object (e.g., run-time object 540 SALES2016) in an RTC (e.g., original RTC 520 SALES) and provide an external link or reference to the database object in the RTC independent of the name or location of the RTC, in accordance with the principles of the present disclosure.

Figure 7:
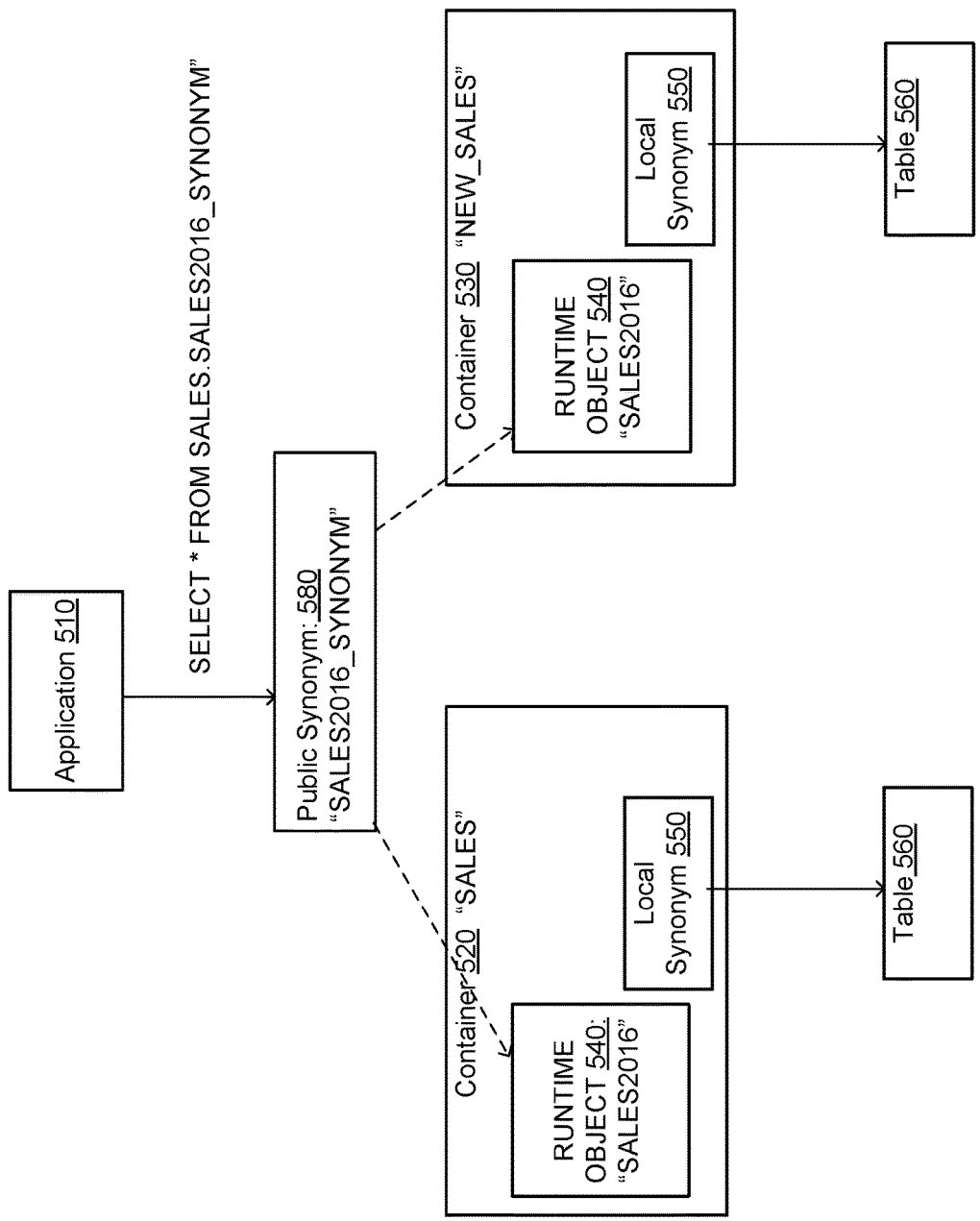
FIG. 7 is a schematic block diagram illustration of how an application can externally access a database object located in a run-time database container using a public synonym as a link or reference to the database object deployed inside the run-time database container independent of the name or location of the run-time database container, in accordance with the principles of the present disclosure.

FIG. 7 shows schematically, for example, how an application may externally access a database object located inside an RTC using the public synonym as a link or reference to the database object independent of the name or location of the run-time database container, in accordance with the principles of the present disclosure.

FIG. 7 shows a scenario, like that of FIG. 5, in which run-time object 540 SALES2016 is contained in original RTC 520 and also in new RTC 530. However, in the scenario of FIG. 7, run-time object 540 SALES2016 is associated with, and linked to, a public synonym (e.g., Public Synonym 580 "SALES2016 SYNONYM"). Application 510 may access run-time object 540 SALES2016 in either original RTC 520 or new RTC 530 by using the public synonym reference to the database object in the application code (e.g., SELECT*FROM SALES2016_SYNONYM). Unlike the scenario in FIG. 5, application 510 does not have to be coded differently to access run-time object 540 SALES2016 in either original RTC 520 or new RTC 530.

In an example implementations, public synonyms (e.g., public synonym 580) may be created and associated with corresponding database objects (e.g., run-time object 540 SALES2016) in an RTC (e.g., original RTC 520), for example, at the time the RTC is first created or deployed in a database (e.g., by conversion of design-time artifacts or files, which may be stored in a corresponding design-time container (DTC)) or at a later time after the RTC has been created or deployed in the database.

Artifact-type specific conversion engines (or build plugins), which may be available in a deployment infrastructure portion of the DBMS, may be used to create or build run-time database objects in a database container from corresponding type design-time artifacts or files. In some implementations, a separate plugin library may exist for each artifact type (e.g., procedure, view, table, table import, sequence, synonym, full-text index, etc.). A plugin may be configured to evaluate the information (i.e., the design-time artifacts or files data) passed to it and to generate, from this information, SQL statements required to deploy, undeploy or redeploy a specific artifact as a database object in the database. In example implementations of the deployment infrastructure and deployment processes, a set of default artifact-type specific plugin libraries may be available to, or installed in, a new DTC for deploying the design-time artifacts therein as database objects. Access to the specific plugin libraries may be defined in a DI configuration file (.hdiconfig). To configure a DTC to use certain build plugins, it may be necessary to first set up and deploy a .hdiconfig container-configuration file.

In an example implementation of the public synonym approach for providing external access to a database object in a database container, a public synonym plugin may be used to create a public synonym object (e.g., public synonym 580) that refers to the database object located in the schema of the database container. An example public synonym plugin configuration may be as follows:

```
.hdiconfig
    "hdbpublicsynonym" : {
        "plugin_name"    : "com.sap.hana.di.publicsynonym",
        "plugin_version": "12.1.0"
    }
```

It will be noted that a public synonym is a singleton database object (i.e., with only one instantiation of the public synonym object needed in the database to provide global access to the corresponding database object deployed inside the database container). Therefore, a public synonym with a specific name should only be created or configured to link with only one DI container.

The public synonym plugin (e.g., com.sap.hana.di.publicsynonym) may be intended to assist in database migration scenarios in which an existing application (e.g., application 510) accesses database objects (e.g., run-time object 540 SALES2016) via public synonyms (e.g., public synonym 580), as shown for example in FIG. 7. In example implementations, the public synonym plugin library (e.g., com.sap.hana.di.publicsynonym) may not be a part of the default artifact-type specific plugin libraries that may be generally available in the DI infrastructure for deploying a new DI container or database objects. Instead, the public synonym plugin library may be explicitly configured, for example, by a database administrator, when needed to create the public synonym.

An example syntax of a public synonym definition and configuration file (i.e., a design-time file) for creating a public synonym may be as follows:

```
{
    "<synonym 1>" : {
        "target": {
            "object"    : "<the target object 1>"
        }
    },
``` where (with reference to FIG. 6), <synonym 1> may be the name of the public synonym (e.g., "SALES2016_SYNONYM") and <the target object 1> may be the name of the corresponding referenced container-specific database object (e.g., RUN-TIME OBJECT 540 "SALES2016").

An example instance of the public synonym definition and configuration file may be as follows:

```
{
    "com.sap.hana.example::A_Public_Synonym" : {
        "target": {
            "object"    : "com.sap.hana.example::A_TABLE"
        }
    }
}.
```

The foregoing example public synonym definition and configuration file may be used to create a public synonym (e.g., "com.sap.hana.example::A_Public_Synonym") in the schema "PUBLIC", with the public synonym pointing to the object (e.g., com.sap.hana.example::A_TABLE) in the container's schema.

In an example implementation, a database container may include many different database objects (e.g., views, tables, procedures, etc.). More than one of these database objects in the database container can be externally referenced by respective public synonyms. In the example implementation, a public synonym definition file may contain multiple public synonym definitions and may, for example, have a syntax as shown by the following file:

```
{
    "<synonym 1>" : {
        "target": {
            "object"    : "<the target object 1>"
        }
    },
    "<synonym 2>" : {
        "target": {
            "object"    : "<the target object 2>"
        }
    },
    <...>
},
``` where <synonym_1>/<synonym_2>/etc. are names of the multiple public synonyms to be created, and <the target object 1>/<the target object 2>/etc. are the corresponding container-specific run-time objects referenced by the respective public synonym names.

In some DBMS implementations, a common naming scheme or namespace rules for database objects and containers across a database may be implemented by the deployment infrastructure. The namespace rules may be defined in one or more file resources (e.g., a file named .hdinamespace), which must be located in a folder to which the naming rules apply—or the root folder of a hierarchy to which the naming rules apply. The file named .hdinamespace may, for example, contain a pattern that describes a naming rules (e.g., rules such as a "dot-and-double-colon, casesensitive" for "name.space::object", an "underscore, sql-style" for "name_space_object", or a "none" for you-get-what-you-write, etc.). This pattern can be checked by the build plugins to ensure that names of the created database objects and containers conform to the namespace rules of the pattern.

For the public synonyms described herein, the naming of public synonyms created by the public synonym plugin (e.g., com.sap.hana.di.publicsynonym) may follow the same namespace rules (e.g., defined in file .hdinamespace) that are applicable to database objects and containers across the database.

Further, in the example implementation of the public synonym approach for providing external access to a database object in a database container, a technical user entity (e.g., a deploy user, or a run-time user) may be assigned or granted a container specific database role that provides privileges (e.g., SELECT, EXECUTE, etc.) to access the database object in the database container. The technical user entity with privileges may use the public synonym as a link to access the corresponding database object in the DI container. In example implementations, the container specific database role may be granted to the user entity via an application programming interface (API) of the database container (e.g., via the container's GRANT_CONTAINER_SCHEMA_ROLES API).

FIG. 8 shows an example computer-implemented method 800 for providing external access to a database object located inside a run-time database container of a database. The database container schema may provide an isolated computing environment for one or more database objects deployed in the container.

Method 800 includes creating a public synonym object outside the run-time database container in the database (810). The public synonym object is associated with the database object deployed inside the run-time database container. Creating a public synonym object 810 includes configuring the public synonym object to provide an external link or reference to the database object deployed inside the run-time database container independent of the name or location (e.g., directory name or path) of the run-time database container (812).

Namespace rules may apply to database objects and database containers across the database. In method 800, creating a public synonym object 810 includes creating the public synonym object as a singleton database object (814), selecting a public synonym name under the same namespace rules applicable to database objects and database containers across the database (816), and using a public synonym plugin to convert a design-time specification file into the public synonym object (818).

In instances where the run-time database container includes multiple database objects, method 800 may include creating another public synonym object outside the run-time database container in the database, and configuring the another public synonym object to provide an external link or reference to another database object inside the run-time database container independent of the name or location (e.g., directory name or path) of the run-time database container.

Method 800 may also include assigning a container specific database role to a technical user entity. The container specific database role may provide the technical user entity privileges to access the database object deployed inside the container via the public synonym object. In some implementations, the assignment of the container specific database role may be accomplished via a container application programming interface (API).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for providing external access to a database object inside a run-time database container of a database, the database container schema providing an isolated computing environment for one or more database objects deployed therein, the method comprising:
   creating a public synonym object outside the run-time database container in the database, the public synonym object being associated with the database object that is inside the run-time database container, wherein creating the public synonym object comprises using a public synonym plugin to convert a design-time specification file into the public synonym object at design-time prior to run-time, wherein the design-time specification file is an artifact in a design-time container that is separate from the run-time database container, and wherein the public synonym is a singleton object with a single instantiation in the database; and
   configuring the public synonym object as an external link to the database object that is inside the run-time database container independent of the name and location of the run-time database container.

2. The computer-implemented method of claim 1, wherein namespace rules apply to database objects and database containers across the database, and wherein creating the public synonym object includes selecting a public synonym name under the same namespace rules applicable to database objects and database containers across the database.

3. The computer-implemented method of claim 1, further comprising:
   creating another public synonym object outside the run-time database container in the database; and
   configuring the another public synonym object as an external link to another database object inside the run-time database container independent of the name and location of the run-time database container.

4. The computer-implemented method of claim 1, further comprising assigning a container specific database role to a technical user entity, the container specific database role providing the technical user entity privileges to access the database object inside the container via the public synonym object.

5. The computer-implemented method of claim 4, wherein assigning the container specific database role to the technical user entity includes assigning the container specific database role via a container application programming interface (API).

6. A non-transitory computer readable storage medium having instructions stored thereon, including instructions which, when executed by a microprocessor, cause a computer system to:
   create a public synonym object outside a run-time database container in a database, the public synonym object being associated with a database object that is inside the run-time database container, wherein creating the public synonym object comprises using a public synonym plugin to convert a design-time specification file into the public synonym object at design-time prior to run-time, wherein the design-time specification file is an artifact in a design-time container that is separate from the run-time database container, and wherein the public synonym is a singleton object with a single instantiation in the database; and
   configure the public synonym object as an external link to the database object that is inside the run-time database container independent of the name and location of the run-time database container.

7. The non-transitory computer readable storage medium of claim 6, wherein namespace rules apply to database objects and database containers across the database, and wherein creating the public synonym object includes selecting a public synonym name under the same namespace rules applicable to database objects and database containers across the database.

8. The non-transitory computer readable storage medium of claim 6, wherein the instructions, when executed by the microprocessor, further cause the computer system to:
   create another public synonym object outside the run-time database container in the database, the another public synonym object being associated with another database object inside the run-time database container; and
   configure the public synonym object as an external link to the another database object inside the run-time database container independent of the name and location of the run-time database container.

9. The non-transitory computer readable storage medium of claim 6, wherein the instructions, when executed by the microprocessor, cause the computer system to:
   assign a container specific database role to a technical user entity, the container specific database role providing the technical user entity privileges to access the database object inside the container via the public synonym object.

10. The non-transitory computer readable storage medium of claim 9, wherein the instructions which, when executed by a microprocessor, cause the computer system to:
   assign the container specific database role to the technical user entity via a container application programming interface (API).

11. A database system comprising:
   at least one processor; and
   a non-transitory computer readable storage medium having instructions stored thereon, including instructions which, when executed by the at least one processor, cause a computer system to:
   instantiate a database, the database comprising:
   a run-time database container providing an isolated computing environment for a database object deployed therein; and
   a public synonym object outside the run-time database container in the database, the public synonym object being associated with the database object inside the run-time database container and providing external access to the database object inside the run-time database container independent of the location of the run-time database container, wherein the public synonym object is created using a public synonym plugin to convert a design-time specification file into the public synonym object at design-time prior to run-time, wherein the design-time specification file is an artifact in a design-time container that is separate from the run-time database container, and wherein the public synonym is a singleton object with a single instantiation in the database.

12. The database system of claim 11, wherein namespace rules apply to database objects and database containers across the database, and wherein the public synonym object has a public synonym name conforming to the same namespace rules applicable to database objects and database containers across the database.

13. The database system of claim 11, wherein the database further comprises:
- another public synonym object outside the run-time database container in the database; and
- the another public synonym object being associated with another database object inside the run-time database container and providing external access to the another database object inside the run-time database container independent of the location of the run-time database container.

14. The database system of claim 11, wherein a container specific database role is assigned to a technical user entity, the container specific database role providing the technical user entity privileges to access the database object in the container via the public synonym object.

* * * * *